Oct. 25, 1927.

E. N. FALES 1,646,903

AIR SPEED INDICATOR

Filed March 2, 1922

Inventor
E. N. Fales
Rob't H. Young, Attorney

Patented Oct. 25, 1927.

1,646,903

UNITED STATES PATENT OFFICE.

ELISHA N. FALES, OF DAYTON, OHIO.

AIR-SPEED INDICATOR.

Application filed March 2, 1922. Serial No. 540,473.

My invention relates to a device for indicating the speed of a moving body and is particularly adapted to be applied to airplanes.

An object of my invention is to eliminate the necessity of outboard instruments for determining air speed by locating practically the entire apparatus within the wings or other parts of the moving body.

Another object of my invention is to provide an instrument which will afford a correct reading of the air speed independently of changes in the angle of incidence.

Figure 1:
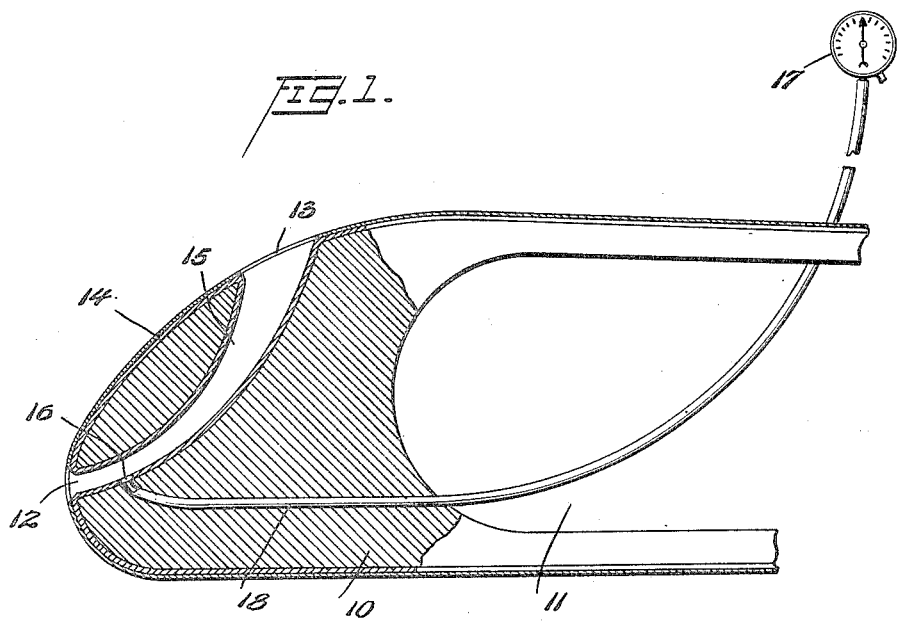
Figure 2:
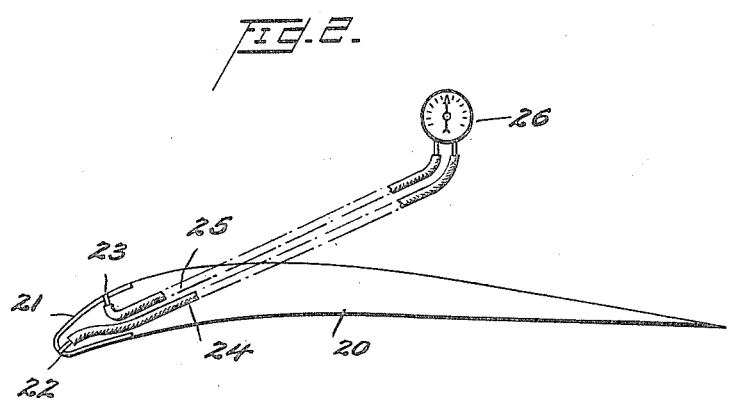

The invention is described in connection with the accompanying drawings, in which:

Figure 1 is a sectional view of a portion of a wing rib having a Venturi tube formed in the nose thereof; and Figure 2 is a somewhat diagrammatic view of a modified form of the invention.

The numeral 10 designates a wing rib having the lightening hole 11 formed therein. A passage of a contour corresponding to a Venturi tube is also formed through the rib preferably in such manner that one end of the passage opens through the leading edge of the wing of the airplane at 12 and the other end opens through the upper covering of the wing at 13 at a point adjacent the leading edge and just forward of the vacuum lift area created in flight over the upper surface of the wing. The wing rib is provided with a metallic cap strip 14 which merges into or is attached to a metallic tube inserted in the Venturi passage so as to form the Venturi tube 15. An opening 16 in the throat of the Venturi tube is connected to a suitable gauge 17 in the cockpit by a tube 18.

The air flow through the Venturi tube depends upon the difference between the pressures at the apertures 12 and 13. The purpose of arranging two apertures as described above is so that when a change in the angle of incidence causes the pressure at 12 to increase, the suction at 13 correspondingly decreases, and vice versa by reason of the fact that the apertures are both in the pressure area devoid of eddy currents. By so locating these apertures the reading of the gauge at a given air speed is independent of the angle of incidence of the wing.

In Figure 2 a profile of a wing 20 is illustrated having metallic sheathing 21 over the nose end thereof. Apertures 22 and 23 are formed at the lower front side of the nose and through the upper surface of the aerofoil respectively. The two apertures 22 and 23 are so located, in the nose as illustrated, or elsewhere along the contour of the wing, that the difference of pressure existing between them is independent of the angle of incidence of the air and dependent solely upon the air speed of the moving body. The apertures 22 and 23 are connected by tubes 24, 25 to a pressure gauge 26 graduated to give readings in terms of air speed.

The Venturi tube of the first form of my invention and the apertures 22, 23 of the second form may be placed at other points of the wing than those illustrated as long as the apertures are located so as to maintain the relation between the pressures specified above. When the points 12 and 13 or 22, 23 have been determined for any aerofoil the instrument is immediately applicable thereto without calibration. The Venturi tube may also be placed in the wing between adjacent ribs instead of in a rib as shown in the drawing. Other changes in the form of my invention herein shown and described may also be made without departing from the spirit and scope of the invention as defined by the appended claims.

I claim:

1. An airspeed indicator, in combination with an aerofoil having a pair of apertures therein adjacent the leading edge of the same, a Venturi tube in the aerofoil forming an air passage between said apertures and a guage in communication with the Venturi tube.

2. In an airplane, the combination with a wing thereof having apertures therein located at such points that when the pressure on one aperture increases due to change of the angle of incidence the suction at the other aperture correspondingly decreases and vice versa, a Venturi tube connecting said apertures, and an indicating device communicating with the throat of said Venturi tube, whereby the air speed indications of said device are independent of the angle of incidence of the wing.

In testimony whereof I affix my signature.

ELISHA N. FALES.